United States Patent

[11] 3,607,209

[72] Inventor Lazaros J. Lazaridis
  Lincoln, Mass.
[21] Appl. No. 827,589
[22] Filed May 26, 1969
[45] Patented Sept. 21, 1971
[73] Assignee Thermo Electron Corporation
  Waltham, Mass.

[54] GLASS FURNACE WITH HEAT PIPE MELTING
  8 Claims, 5 Drawing Figs.
[52] U.S. Cl. .................................................. 65/337,
  65/136, 65/347, 65/356
[51] Int. Cl. .................................................. C03b 5/04
[50] Field of Search .................................................. 65/337,
  338, 339, 347, 355, 356, 134, 135, 136

[56] References Cited
UNITED STATES PATENTS

| | | | |
|---|---|---|---|
| 2,119,949 | 6/1938 | Blau et al. | 65/347 X |
| 3,151,201 | 9/1964 | Kilian et al. | 13/6 |
| 3,388,204 | 6/1968 | Ellis | 13/18 |
| 3,523,780 | 7/1970 | Plumat | 65/135 |

Primary Examiner—Arthur D. Kellogg
Attorney—Kenway, Jenney & Hildreth

ABSTRACT: An industrial furnace for the melting of glass which includes a tank of refractory material capable of containing molten glass. Heat pipes penetrate that part of the refractory wall which is wetted by glass and are immersed in the molten glass in such a manner as to heat the glass uniformly. The heat pipes are energized from burners disposed outside the tank. Molten glass may be permitted to flow between the heat pipes and the ports in the wall of the tank through which they protrude. This glass protects the heat pipes from exposure to air and burner flames. Also, when this glass freezes as it contacts the much cooler ambient air and accessory cooling collars, it forms seals to prevent the escape of additional molten glass from the tank.

GLASS FURNACE WITH HEAT PIPE MELTING

The melting of glass on industrial scale as generally carried out today is a rather specialized operation. It is commonly done in furnaces which include a large area roofed tank of shallow depth. A charge of raw materials for the making of glass is loaded at one end of such tanks and burners are arranged to fire across of the charge. Heat is transferred by radiation and convection from the flames and to some extent by reradiation from the refractory roof.

Glass is a material with fairly low thermal conductivity, so transferring sufficient heat through its thickness to effect complete melting demands high temperatures at the input surface. On the other hand, for uniformity of glass quality, it is important that, during the manufacture of glass, temperature difference through its volume be kept to a minimum, while overall glass temperature be kept high for maintaining productivity levels. These factors dictate that conventionally heated furnaces be shallow and with large area so that heat from the overfired glass surfaces need travel only a relatively short distance through the glass to insure a small temperature gradient. Basic melting of the charge and support of the required chemical reactions is thus obtained but frequently it is necessary to increase the productivity of a given furnace and at the same time provide more uniform heat flow and lower temperature gradient throughout the molten glass than is possible by the use of simple flames in a direct fired furnace. To obtain this increased productivity with uniformity of heat, advantage is generally taken of the electrical conductivity of molten glass. That is, a current can be passed through the molten glass and the glsss's own resistance provides a uniform heating throughout the material. The contribution of such added heat together with uniformity of heating permits increased productivity without an overall increase in glass temperature which avoids corrosion of the refractory tank walls. In addition, bubbles and other flows which might otherwise occur because of excessive superheating in the glass are avoided.

Glass melting is generally adequate with such systems, but in the case of direct fired furnaces, efficiency in terms of heat utilization is rather limited. This remains so despite the use of bulky and expensive regenerators to preheat the combustion air in order to achieve higher flame temperature and recover some of the heat of the combustion products. Also, in the case of flame heated furnaces with electrical "boosting" for increased productivity, the required equipment is complex and expensive. This is understandable because two sources of energy, namely fuel and electricity, must be accommodated and controlled. It is, then, one of the primary objects of the present invention to simply industrial glass melting furnaces.

Another object of the present invention is to optimize the geometry of a glass furnace utilizing immersion heating by minimizing the glass-wetted surface of a tank for a given volume of glass.

Another object of the present invention is to increase the efficiency of glass-melting furnaces.

Another object of the present invention is to minimize pollution of the atmosphere by particulate matter and gaseous effluents from a glass furnace by eliminating combustion products on the surface or in contact with glass or its constituents.

A further object of the present invention is to improve the uniformity of heat distribution in the tank of a glass-melting furnace to increase the quality of the output.

A still further object of this invention is to increase the productivity of a glass furnace by the addition of heat to the bulk of the glass volume through immersion heaters but without increasing the furnace temperature.

Generally, the present invention is based upon a concept of utilizing a heat transfer device known as a "heat pipe" in the form of multiple heaters immersed in the glass contained in a glass-making tank. The heat pipes are sealed into the tank and are protected from damage by the heat source and ambient atmosphere by molten glass which is deliberately permitted to flow from the tank into the area surrounding the heat pipe. The configuration of the tank and the distribution of the heat pipes throughout the tank are such that a substantially uniform temperature pattern is obtained.

For a better understanding of the present invention together with other objects, features, and advantages, reference should be made to the following description which should be read in connection with the appended drawing in which.

Figure 1:
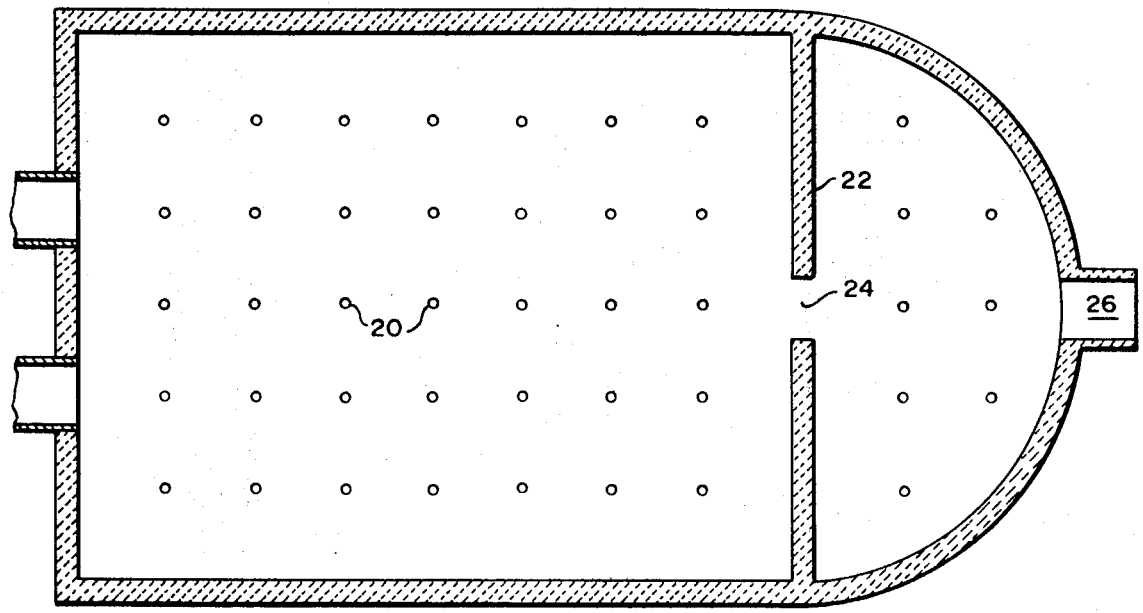
FIG. 1 is a plan view of a typical flame-heated glass furnace with a possible arrangement of heat pipe immersion heaters the regenerators being omitted for simplicity.

In Fig. 1 there is shown a portion of a melting furnace similar in configuration to those now used in the glass industry. Although such furnaces may vary considerably in size and capacity, they are generally quite shallow but rather massive and of large area. In the typical furnace of Fig. 1, the length might be 40 feet or more and the width approximately 30 feet. For convenience, the furnace itself may be as much as 8 or 10 feet above the floor of the building in which it is mounted. Its internal height may be approximately 6 to 8 feet.

Figure 2:
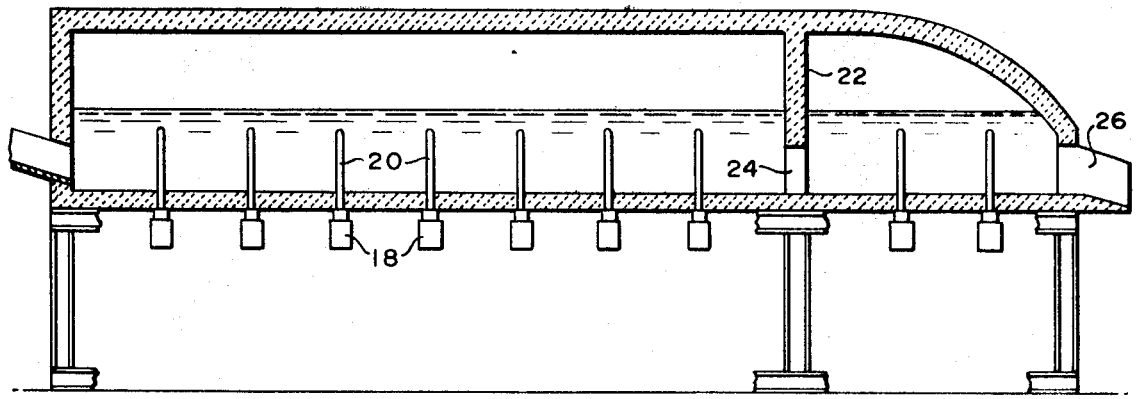
FIG. 2 is a front elevation of the furnace of Fig. 1 shown in section; with a possible arrangement of heat pipe immersion heaters.

At the left-hand side of the furnace as shown in Figs. 1 and 2, are a pair of charging inlets 12 and 14 through which the solid material to be melted is introduced into the furnace,. These inlets may be varied in size and number depending upon the type of charge and the speed of operation of the furnace. The furnace tank or body 16 is preferably made of silica brick or fused-cast zirconia-alumina-silica refractory, and the bottom of the tank may be structurally reinforced by steel or other material capable of withstanding the great weight. Beneath the tank are a number of burners 18 which may be conveniently spaced e.g. 5 feet from each other in a tank of the dimensions recited above, and according to the heat requirements dictated by the geometry of the furnace, the type of glass manufactured and the refractory used. Extending upwardly from each of the burners is a heat pipe 20 which may penetrate into the interior of the furnace by 3 feet or more.

Adjacent the right end of the tank a barrier 22 which is also made of fused cast refractory may be erected. At a central point adjacent the intersection of the barrier 22 and the bottom of the tank an opening may be formed. Beyond the barrier, the tank is preferably tapered in the horizontal and vertical planes to meet an outlet opening 26 formed at the right-hand end of the tank. It will be noted that the burners 18 and heat pipes 20 are also present in the end of the tank adjacent the outlet. From the outlet 26, molten glass is withdrawn.

Figure 3:
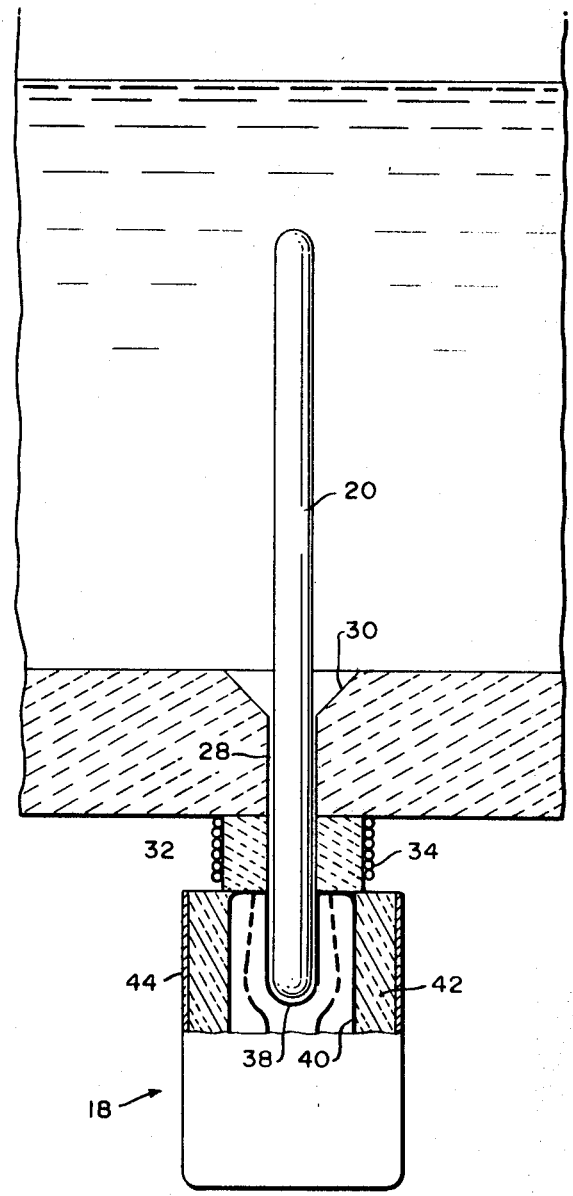
FIG. 3 illustrates the heat pipe as it is disposed at the bottom of a glass tank and in the molten glass.

In Fig. 3, some detail on the burner and heat pipe may be seen. The heat pipe 20 may be conventional in nature following generally in its design the principles disclosed in an article by Feldman, Jr. and Whiting in Mechanical Engineering of Feb. 1967 and in an article by Eastman appearing in the Scientific American of May, 1968. In the present case, however, the heat pipe is preferably of about 4 inches in outside diameter and, as noted above, it extends about 3 feet into the interior of the tank. An opening 28 which may be countersunk as at 30 is formed in the bottom of the tank to accommodate the heat pipe. Just beneath the lower surface of the tank, a toroidal transition section 32 is provided and the transition section 32 is preferably surrounded by a coil 34 through which coolant may be passed. The lower extremity of the heat pipe 20 is preferably supported in a cup-shaped member 38 having a flange top by which it in turn is supported by a cylindrical shell 40. The cylindrical shell 40 constitutes the enclosure for a burner and it is surrounded by a layer on insulation 42 contained within a shell 44.

Figure 4:
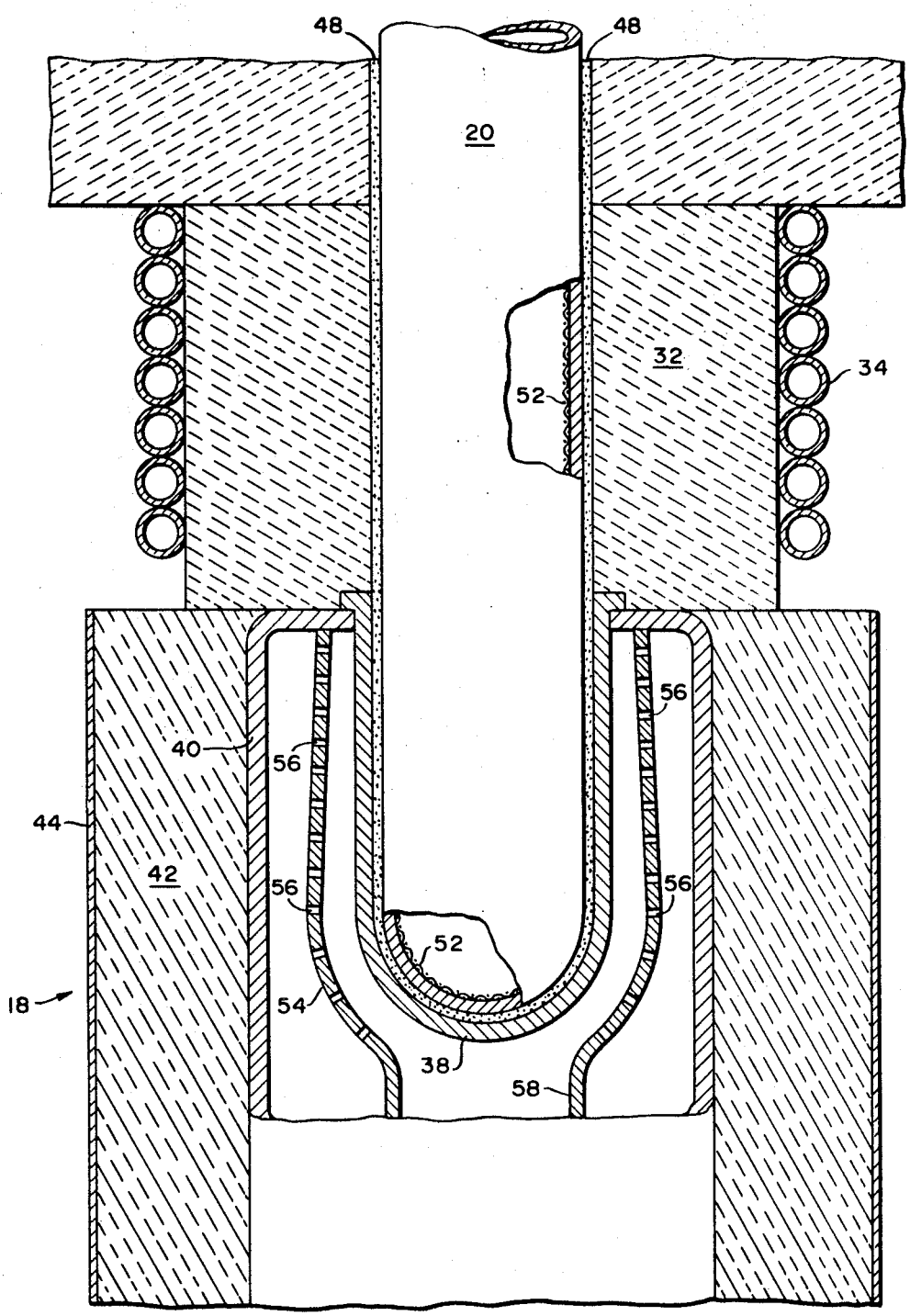
FIG. 4 illustrates detail on the heat input and interconnection of the heat pipe with the glass furnace.
Figure 5:
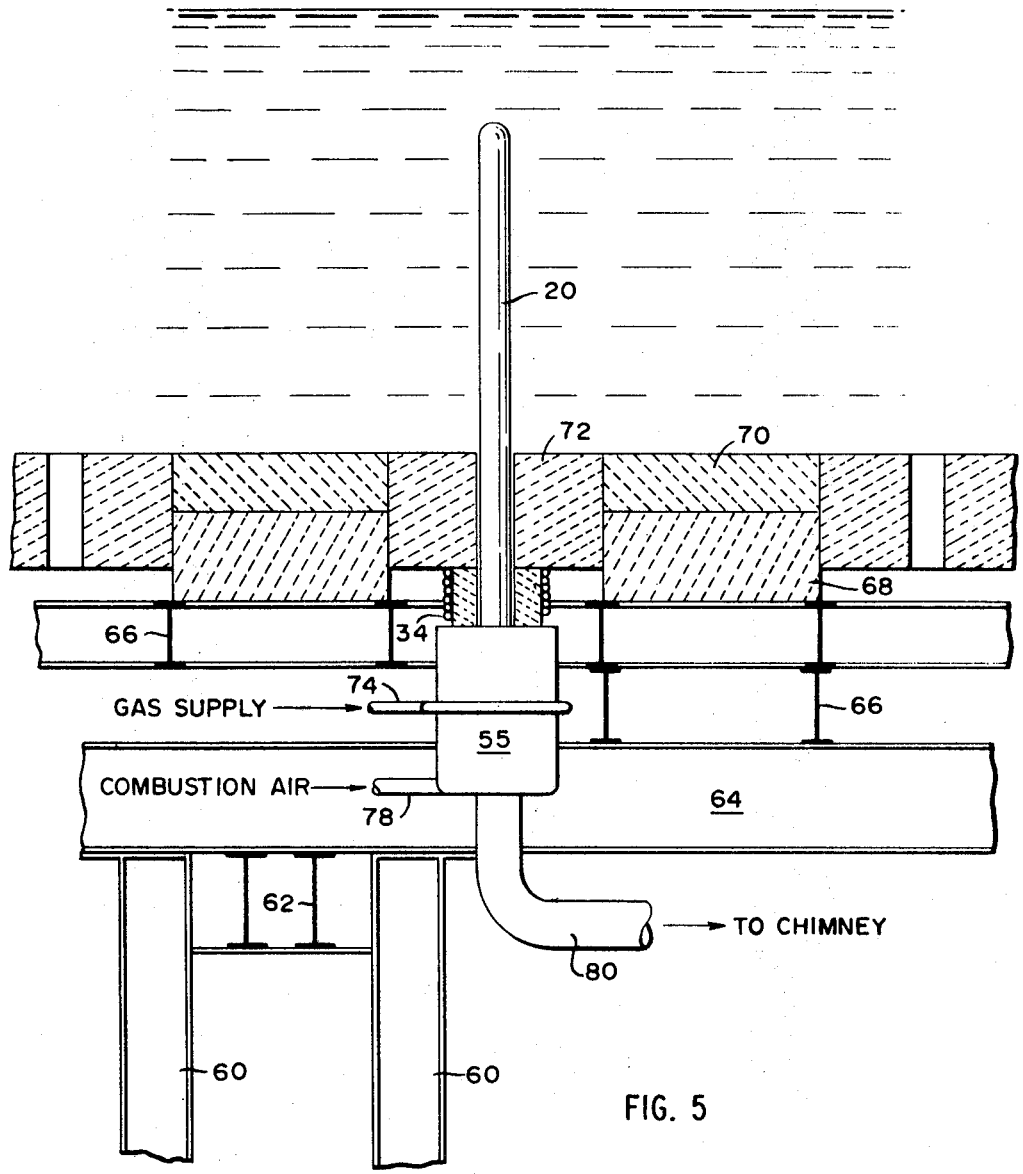
FIG. 5 outlines structural and operating details on the heat pipe and furnace.

Fig. 4 provides greater detail on the apparatus of Fig. 3. It may be seen that a relatively small cylindrical space 48 is deliberately left between the outside of each heat pipe 20 and the internal surface of each openings in the bottom of the tank and each transition piece 32. The space 48 is also preserved between the rounded lower end of the heat pipe and the support cup 38.

Within the heat pipe 20 there may be a liner 52 made of suitable mesh or other material capable of providing capillary action to aid in returning the liquified fluid from the portion of the heat pipe within the tank to the lower end of the heat pipe such a capillary or wick is conventional and forms no part of the present invention.

Surrounding the cup-shaped support 38 is a tapered cylindrical jet impingement barrier 54. This barrier is perforated over its surface, the perforations preferably being denser adjacent the upper extremity than they are at the lower or throat portion. A burner 55 for gas or other suitable fuel is arranged in such a fashion that its products of combustion are driven through the space between the support 40 and the barrier 54. The apertures 56 of the barrier cause the products of combustion to be jetted upon the support 38. Heat transfer is thus maximized in accordance with the teachings of U.S. Pat. No. 3,416,011 to Lyczko entitled Heat Exchangers and assigned to the assignee of the present application. The lower end of the barrier 54 is tapered to form a throat 58 through which flue gases are exhausted.

Reverting for the moment to Fig. 3, it may be seen that the molten glass in the tank is in communication with the countersunk openings 30 and, accordingly, with the cylindrical space 48 surrounding the heat pipe 20. When the burners are operating and heat is transferred to the interior of the tank to melt the glass, the glass flows from the tank into the countersunk opening 30 and into the space 48. However, as the molten glass reaches the bottom surface of the tank adjacent the transition section 32, the temperature of the section by reason of ambient air or, if necessary, the action of the cooling coil 34 is sufficiently low that the glass is solidified. Any tendency of the glass to flow outwardly between the bottom tank surface and the transition piece 32 is inhibited because the temperature is well below the glass melting point at a very short distance from the outer wall of the heat pipe. Immediately adjacent the heat pipe, however, the temperature is at all times high enough to maintain a thin layer of glass in the molten state permitting it to flow into the space between the cup-shaped support 38 and the lower end of the heat pipe. The seal which is formed is, therefore, a seal against the ambient atmosphere.

The fragmentary illustration of the glass tank as shown in Fig. 4 gives an indication of the heavy structural members required for the tank of the glass melting furnace. Basic support is derived from heavy steel uprights forming legs 60 braced by I-beams 62. Girders in the form of I-beams 64 may be supported upon the legs 60. Above the heavy girders 64 an open grid of slightly smaller I beams 66 is carried. The nature of the various grids is such as to permit circulation of air beneath the tank of the melting furnace.

Disposed upon the grid 66 is a lower course of refractory material which may be composed of Monofrax (trade name) blocks 68. In some instances it is desirable to have a layer of zircon pavers upon the blocks 68, the pavers 70 being in contact with the glass of the furnace. At the points of entry of the various heat pipes, a port is formed and this may be entirely through a zircon paver as at 72. The burner 55 may be supported in any conventional fashion and it may receive its fuel supply in the form of gas or other suitable material through a line 74. The line 78 may serve in a similar capacity to bring combustion air to the burner 55. Finally, a line 80 is provided to connect the throat 58 of the burner 55 to the stack to evacuate flue gases.

It has proven desirable to spray the outer surface of the heat pipes with a glass-zirconium mixture prior to assembling the apparatus. The coefficient of expansion of the mixture should match that of the heat pipe. In this fashion, protection of the heat pipe is had during the starting period before molten glass flows in to provide the desired protection.

The foregoing description is concerned with one embodiment of the present invention and illustrates various features of the invention. It should not be construed as limiting the invention which is defined by the spirit and scope of the appended claims.

What is claimed is:

1. A glass-melting furnace comprising a tank for holding a charge of said glass to be melted, said tank having a plurality of openings formed in a wall thereof, said openings being uniformly and symmetrically arranged, a like plurality of heat pipes, each of said heat pipes having an end thereof penetrating one of said openings and disposed in said charge of glass in said tank and the other end thereof disposed exteriorily of said tank, and means disposed exteriorily of said tank for applying heat energy to said other ends of said heat pipes whereby said heat energy is transferred to said end of said heat pipe disposed in said charge of glass to uniformly distribute said heat energy through said charge of glass.

2. A glass-melting furnace as defined in claim 1 including members abutting the outer surface of said wall adjacent said openings and wherein said wall is a wall wetted by said glass as said glass becomes molten, each of said openings being of larger diameter than the outside diameter of each of said heat pipes, whereby said molten glass flows therebetween, glass flowing outwardly from said openings and between said outer surface and said abutting members becoming cooled and solidified to form seals about said openings.

3. A glass-melting furnace as defined in claim 1 wherein said means for applying heat to the other ends of said heat pipes are disposed remotely from said tank, the opposite ends of said heat pipes being immersed in said glass as said glass becomes molten.

4. A glass-melting furnace as defined in claim 2 includes means formed adjacent each of said openings to cool and solidify said glass comprising a container of coolant disposed in spaced relationship to at least a portion of each of said heat pipes.

5. A glass-melting furnace comprising a tank for holding a charge of said glass to be melted, said tank having a plurality of openings formed in a wall thereof, said openings being uniformly and symmetrically arranged, a like plurality of heat pipes, each of said heat pipes having an end thereof penetrating one of said openings and disposed in said charge of glass in said tank, and a burner and a heat exchange surface disposed remotely from said tank for applying heat to the other ends of said heat pipes whereby heat is uniformly distributed throughout said charge of glass, said heat exchange surface being spaced from said heat pipe, a layer of molten glass being formed in the space between said heat pipe and said heat exchange surface.

6. A glass-melting furnace comprising a tank for holding a charge of said glass to be melted, said tank having a plurality of openings formed in a wall thereof, said openings being uniformly and symmetrically arranged, a like plurality of heat pipes, each of said heat pipes having an end thereof penetrating one of said openings and disposed in said charge of glass in said tank, a burner and a heat exchanger surface disposed remotely from said tank for applying heat to the other ends of said heat pipes whereby heat is uniformly distributed throughout said charge of glass, said heat exchange surface being spaced from said heat pipe, a layer of molten glass being formed in the space between said heat pipe and said heat exchange surface and a baffle surrounding said heat transfer surface, a plurality of openings being formed in said baffle and means for conducting products of combustion from said heater to the area surrounding said baffle, said products of combustion passing through said openings in said baffle to impinge as jets upon said heat transfer surface.

7. A glass-melting furnace as defined in claim 1 wherein said wall comprises the bottom of said tank and a plurality of burners are disposed beneath said tank to heat said heat pipes.

8. A glass-melting furnace as defined in claim 7 including a heat transfer surface surrounding each of said heat pipes and an apertured baffle surrounding each of said heat transfer surfaces, products of combustion from said burners being passed through said apertures of said baffle to impinge upon said heat transfer surface.